(12) United States Patent
Ukai et al.

(10) Patent No.: US 6,254,244 B1
(45) Date of Patent: Jul. 3, 2001

(54) LUMINAIRE AND DISPLAY USING THE SAME

(75) Inventors: Kenichi Ukai, Nara-ken; Nobuyuki Takahashi, Kawachinagano; Eiichi Shitamori, Sodegaura, all of (JP)

(73) Assignees: Sharp Kabushiki Kaisha, Osaka; Idemitsu Kosan Co., Ltd., Tokyo, both of (JP)

( * ) Notice: Subject to any disclaimer, the term of this patent is extended or adjusted under 35 U.S.C. 154(b) by 0 days.

(21) Appl. No.: 09/171,511

(22) PCT Filed: Apr. 18, 1997

(86) PCT No.: PCT/JP97/01351

§ 371 Date: Oct. 19, 1998

§ 102(e) Date: Oct. 19, 1998

(87) PCT Pub. No.: WO97/40517

PCT Pub. Date: Oct. 30, 1997

(30) Foreign Application Priority Data

Apr. 19, 1996 (JP) .................................................. 8-098762

(51) Int. Cl.$^7$ ....................................................... F21V 7/04
(52) U.S. Cl. .................. 362/31; 362/23; 362/26; 362/227; 362/240; 362/241; 362/263; 362/459; 362/489; 362/509; 349/56; 349/67; 349/113
(58) Field of Search .................. 362/23, 26, 29, 362/30, 31, 227, 228, 509, 459, 489, 249, 318, 263, 240, 241; 349/56, 67, 113

(56) References Cited

U.S. PATENT DOCUMENTS

| | | | | |
|---|---|---|---|---|
| 4,641,227 | * | 2/1987 | Kusuhara | 362/31 |
| 4,786,767 | * | 11/1988 | Kuhlman | 200/5 |
| 5,079,681 | * | 1/1992 | Baba et al. | 362/263 |
| 5,273,685 | * | 12/1993 | Takata et al. | 252/511 |

FOREIGN PATENT DOCUMENTS

| | | |
|---|---|---|
| 0 767 340 | 4/1997 | (EP) . |
| 7-43680 | 2/1995 | (JP) . |
| 7-501155 | 2/1995 | (JP) . |
| 93/10479 | 5/1993 | (WO) . |

* cited by examiner

Primary Examiner—Cassandra Spyrou
Assistant Examiner—Craig Curtis
(74) Attorney, Agent, or Firm—Flynn, Thiel, Boutell & Tanis, P.C.

(57) ABSTRACT

A controllable auto-heating type heat source is located at a periphery of a light source and light reflecting layers are placed between the light source and the controllable auto-heating type heat source. Therefore, use of a temperature detector and a control circuit in order to control the heat source are unnecessary, so that thermal runaway of the heat source is avoided. Further, the light reflecting layers reflect the light irradiated from the light source, so that the amount of the beam of light shielded by the heat source is decreased.

24 Claims, 7 Drawing Sheets

LUMINAIRE AND DISPLAY USING THE SAME

FIELD OF THE INVENTION

This invention relates to a luminaire having a heater on the periphery of a low-pressure mercury lamp or other light sources, and a display using the luminaire.

BACKGROUND OF THE INVENTION

Luminaires of various types, such as a direct-type back light type, an edge light type and so on, are used for liquid crystal displays in a dashboard on a vehicle, a vehicle navigation system and so on.

Low-pressure mercury lamps are widely used as luminaires, using liquid crystal, in view of the advantages of; the luminous efficacy superior to a filament lamp, the smaller heat value, the long lasting use, a larger luminous area and uniform distribution of light in view of a long current discharge channel, and so on.

The low-pressure mercury lamp is used in severe temperature conditions also. For example, when vehicles are driven in all areas and ranges of temperature, from 40° C. in tropical zones, to −30° C. below zero in frigid zones, the low-pressure mercury lamps used in the dashboard display, the vehicle navigation system and so on are also exposed under the above temperature conditions.

The properties of the low-pressure mercury lamp are determined by the vapor pressure of mercury sealed inside, so that they are always under the influence of the ambient temperature. Especially, the beam of light and the starting characteristic are under the influence remarkably. More specifically, the radiation of wavelengths 254 nm and 185 nm are decreased in low-temperatures, so that the beam of light is decreased and dimmed; and it is also difficult to light due to the decrease in the partial pressure of the mercury vapor in relation to the sealed inert gas, therefore taking a long time to reach the specified luminance.

The luminous efficacy reaches the maximum in the ambient temperature of approximately 40° C., so that the general low-pressure mercury lamp is preferably used in the range from 5° C. to 40° C.

Therefore, the luminaire used in low temperature conditions is provided with a heater on the periphery of the low-pressure mercury lamp, in which the surface temperature of the low-pressure mercury lamp is controlled by various means.

As conventional luminaires, for example, there is Conventional example 1 (Japanese Patent Laid-open No. Hei7-43680), which is composed of: a heater having a predetermined width and provided on the surface of a low-pressure mercury lamp lighting a liquid crystal; a temperature detecting means for detecting a temperature of the low-pressure mercury lamp; and a controller controlling the heater in accordance with the temperature of the low-pressure mercury lamp detected by the temperature detecting means. In turn, the controller is composed of: an inverter lighting the low-pressure mercury lamp; an inverter current source connected to the inverter; and a current source controlling means for controlling On/Off of the inverter current source in accordance with the temperature of the low-pressure mercury lamp.

In Conventional example 2 (Translated National Publication of Patent Application No. Hei7-501155; International Laid-open No. WO 93/10479), plural fluorescent lamps are arranged on a liquid crystal display, a thin-section type heating element is thermally coupled onto the opposite side of the low-pressure mercury lamp from the liquid crystal display, and the heating element is thermally coupled by a PTC thermistor, therefore the temperature of the heating element is controlled by the PTC thermistor.

And further, in Conventional example 3 (Japanese Patent Laid-open No. Sho63-224140), an auto-temperature-control heating element portion having the positive temperature coefficient characteristics (PTC characteristics) is tight attached to an ordinary fluorescent lamp along a predetermined width.

However, in Conventional example 1, the heater is provided on the surface of the low-pressure mercury lamp to have the predetermined width, so that the heater shields the beam of light irradiated from the low-pressure mercury lamp, thus decreasing the amount of light irradiated onto the liquid crystal.

Furthermore, the heater is controlled by the control circuit composed of the inverter, the inverter current source and the inverter current source controlling means, so that the thermal runaway of the heater is produced when the above control circuit is not operated correctly.

In Conventional example 2, the temperature of the heating elements heating the low-pressure mercury lamp is controlled by the PTC thermistor, so that the thermal runaway of the heater is produced when the PTC thermistor is not operated correctly.

In Conventional example 3, the auto-temperature-control heating element portion is tight attached to the general fluorescent lamp along the predetermined width, so that the heating portion shields the beam of light from the fluorescent lamp.

It is an object of the present invention to provide a luminaire capable of decreasing the amount of the beam of light shielded by heating source and avoiding thermal runaway of the heating source, and a display using the luminaire.

SUMMARY OF THE INVENTION

The present invention is intended to attain the aforementioned object by providing a light reflecting layer between light source and a controllably auto-heating type heat source.

More specifically, a luminaire according to the present invention, in which a controllable auto-heating type heat source is placed on the periphery of a light source, is characterized by including a light reflecting layer provided at least between the light source and the controllable auto-heating type heat source.

In this invention described above, the heat source is a controllable auto-heating type and so a temperature detecting means and a control circuit in order to control the heat source are not needed, thus avoiding the thermal runaway of the heat source.

Furthermore, the light reflecting layer is provided between the light source and the controllable auto-heating type heat source, so that the light reflecting layer reflects the light irradiated from the light source, resulting in the small amount of the beam of light shielded by the controllable auto-heating type heat source.

In the present invention, a translucent material, having a larger thermal conductivity than that of air, may be provided between the light source and the light reflecting layer.

For the above structure, the light reflecting layer satisfactorily reflects the light irradiated from the light source, thereby further decreasing the amount of the beam of light shielded by the controllable auto-heating type heat source.

The light source may be formed to be a long sized shape; and the controllable auto-heating type heat source may have an electrode couple placed along the longitudinal direction of the light source.

With the above structure, the electrode couple is placed along the longitudinal direction of the light source, so that the local heating does not occur in the longitudinal direction of the controllable auto-heating type heat source, thereby uniformly heating the light source.

In the present invention, the controllable auto-heating type heat source may have thermoplastic resin and conductive particles consisting of carbon black, and further have a heating element showing the positive temperature coefficient characteristics.

With the above structure, the heating element assuredly has the positive temperature coefficient characteristics, so that the resistance value is not decreased in a high-temperature area, thereby effectively avoiding overheating of the heating element.

And, the resistance temperature property of the controllable auto-heating type heat source may be designed to have a change in resistance value of more than 1.2 times, in a range between the temperature at the maximum luminous efficacy of the light source, and a temperature being 30° C. higher than the temperature at the maximum luminous efficacy of the light source.

In the above structure, the resistance value is increased when a temperature exceeds the temperature at the maximum luminous efficacy of the light source, so that the overheating of the heat element just after the maximum luminous efficacy of the light source has been reached can be avoided.

The resistance temperature property of the controllable auto-heating type heat source may be defined so that resistance value at temperature at which the luminous efficacy of the light source reaches its maximum is less than ten times larger than resistance value at temperature minus 30° C.

In the above structure, the resistance value of the heat source is small until the luminous efficacy of the light source reaches the maximum value, so that a great amount of electric current flows into the heating source until the luminous efficacy of the light source reaches the maximum value. Thereby increasing the heat value of the heat source.

And, the resistance temperature property of the controllable auto-heating type heat source can be that the resistance value does not decrease at the temperatures ranging from a temperature at which the luminous efficacy of the light source reaches its maximum to a temperature which is 150° C. higher than the temperature at which the luminous efficacy of the light source reaches its maximum.

In the above structure, even when the luminaire is used in extremely high temperatures, the heat source is prevented from overheating.

The controllable auto-heating type heat source may be abutted to the light source to be thermally associated.

In the above structure, heat generated in the heat source is directly transferred to the light source, thus enhancing the heat efficiency for the light source.

And, the controllable auto-heating type heat source may be placed to be distant from the light source on the opposite side from which the light source irradiates light.

In the above structure, although the heat source is placed on the periphery of the light source, the decrease of the light reflection efficiency is smaller, and hence the unquestionable decrease of the amount of the beam of light shielded by the heat source.

The light source may be an approximately cylindrical shaped low-pressure mercury lamp, in which the width of the controllable auto-heating type heat source is less than half of the diameter of the low-pressure mercury lamp.

In the above structure, it is possible to decrease the amount of the beam of the low-pressure mercury lamp which is shielded by the heat source.

The light source and the controllable auto-heating type heat source can be mutually adhered with a self-adhesive material.

In the above structure, the thermal connection between the light source and the controllable auto-heating type heat source is achieved by simple means.

And further, the light source can be a bent low-pressure mercury lamp; and the controllable auto-heating type heat source can have pliability and be placed along the low-pressure mercury lamp.

With the above structure, it is possible to place the heat source to correspond with the specified configuration of the low-pressure mercury lamp, thus allowing the low-pressure mercury lamp to be satisfactorily heated regardless its configuration.

And further, in the present invention, a display can be composed of the luminaire described thus far and a translucent type display panel illuminated by the luminaire, in which the translucent type display panel may be a liquid crystal panel.

The display may be an edge-light type liquid crystal device having a light guiding plate guiding light from the luminaire, in which the controllable auto-heating type heat source may be placed on the opposite side of the light source from the light guiding plate.

Or the display may be an edge-light type liquid crystal device having a light guiding plate guiding light from the luminaire, in which the controllable auto-heating type heat source may be adhered to the light source through a self-adhesive material having translucent in any one of two directions except for the other two directions of the side of the light guiding plate and the opposite side of the light source from the light guiding plate.

In this invention, the light guiding plate can be a transparent acrylic plate.

The light reflecting layer may be composed of a reflective sheet covering the back face of the light guiding plate and the periphery of the light source.

And further, the reflective sheet can be made of white foaming polyethylene terephthalate.

DETAILED DESCRIPTION OF THE INVENTION

Figure 1:
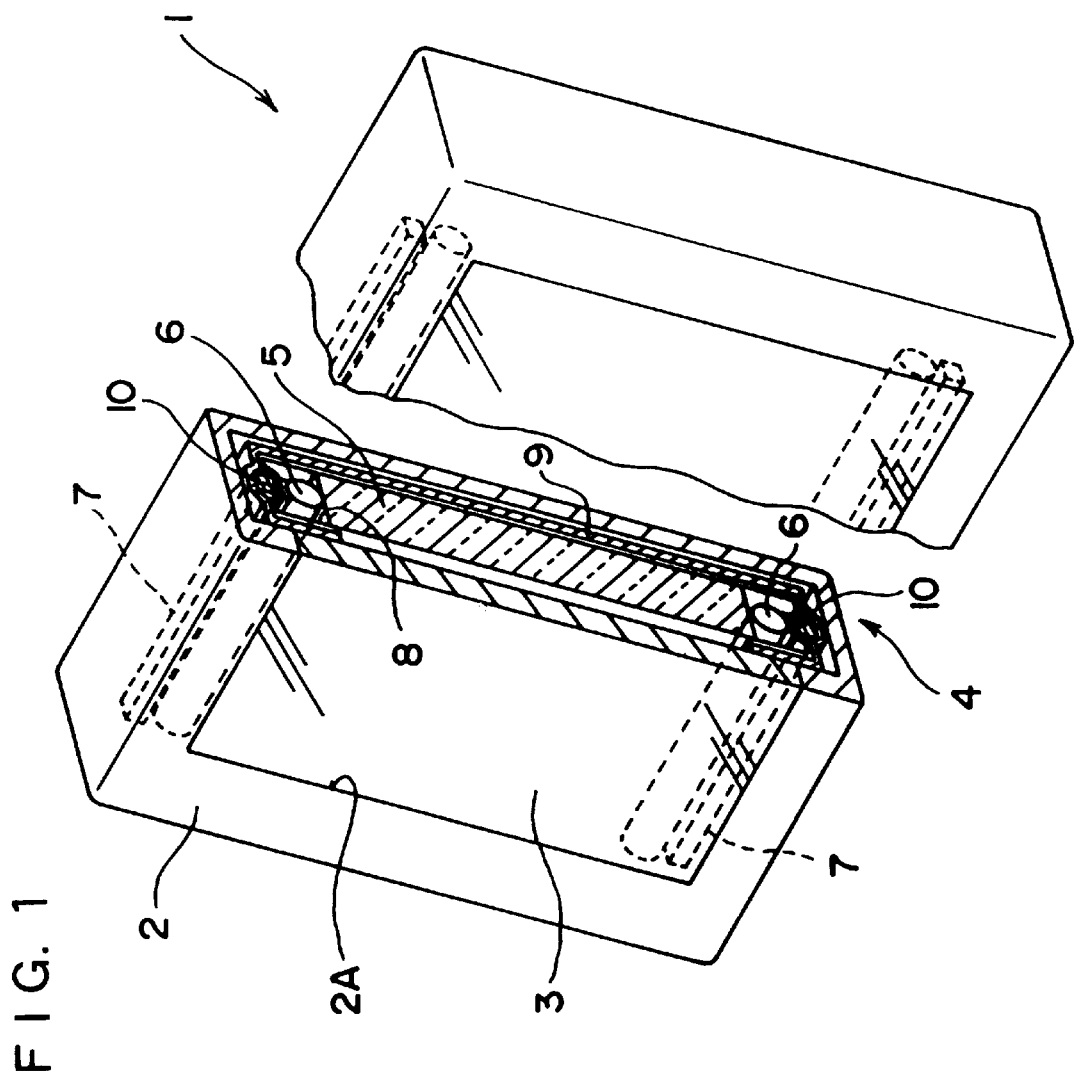
FIG. 1 is a perspectively cutaway view of a display according to the first embodiment of the present invention.

The preferred embodiments according to the present invention will be described below with reference to the attached drawings. In the description of the following embodiments, the same reference numerals and symbols will be used to designate the same or corresponding components as those in each embodiment, so that the description will be omitted or simplified.

Figure 2:
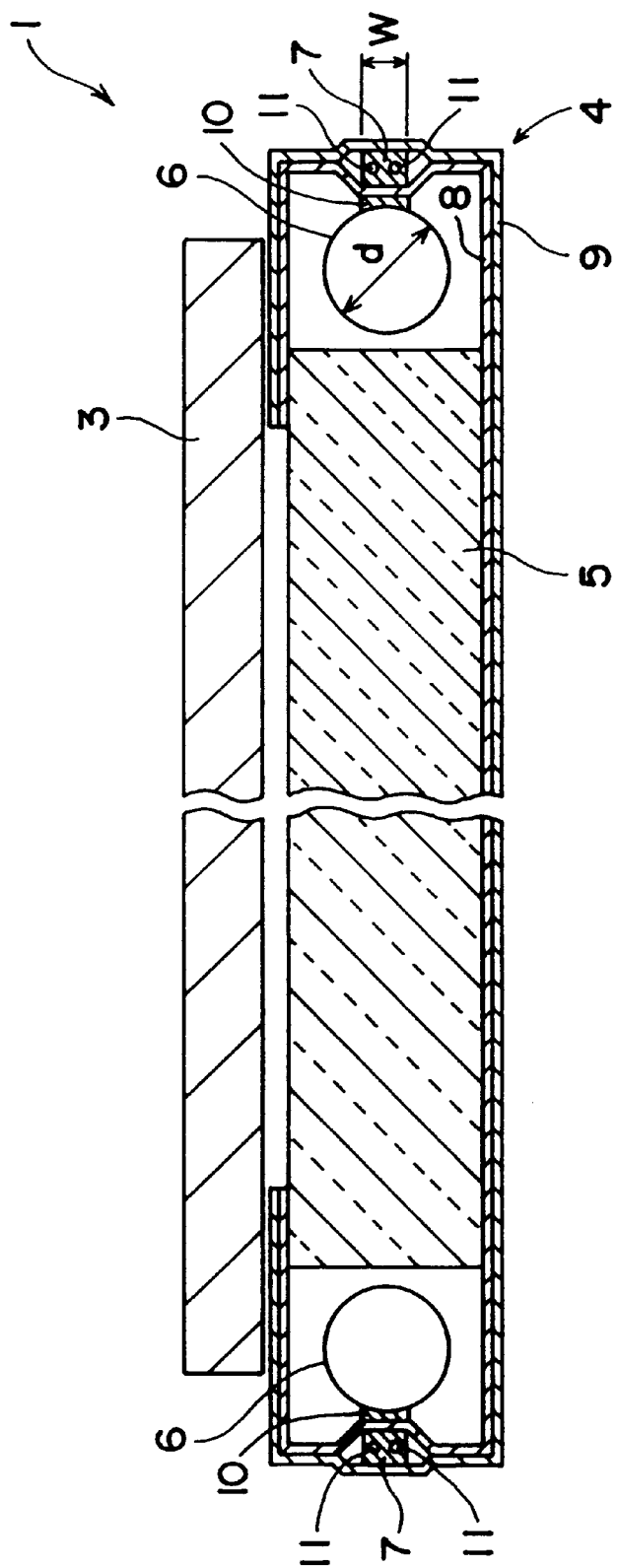
FIG. 2 is a fragmentary sectional view of the main part of FIG. 1.
Figure 3:
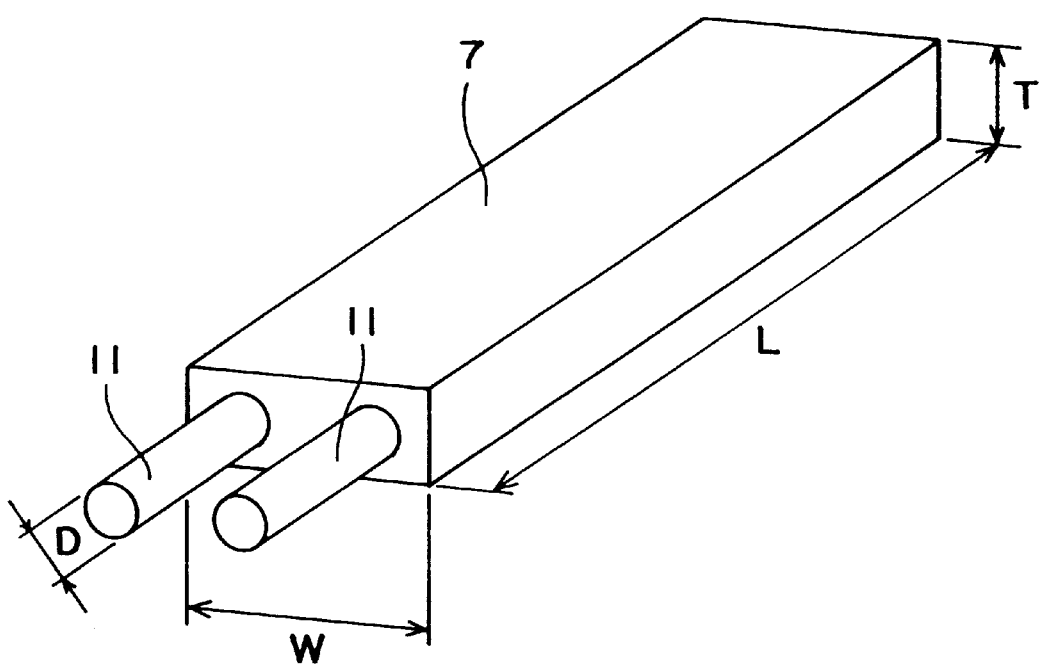
FIG. 3 is a perspective view showing a controllable auto-heating type heat source.

FIG. 1 to FIG. 3 show a display 1 according to the first embodiment of the present invention.

In FIG. 1 and FIG. 2 showing the entire structure, the display 1 is an edge-light type vehicle navigation system including: a box-shaped casing 2 having a rectangular opening 2A on a side thereof; a liquid crystal panel 3 as a translucent type display panel provided to the opening 2A of the casing 2; a luminaire 4 lighting the liquid crystal panel 3; and a light guiding plate 5 made of a transparent acrylic plate, which guides the light from the luminaire 4 to the liquid crystal panel 3.

The luminaire 4 is, in turn, composed of: two low-pressure mercury lamps 6 placed as a light source along vis-a-vis ends of the light guiding plate 5; a controllable auto-heating type heat source 7 provided on the opposite side of each of the low-pressure mercury lamps 6 from the light guiding plate 5; a first light reflecting layer 8 placed between the low-pressure mercury lamp 6 and the controllable auto-heating type heat source 7 to face the low-pressure mercury lamp 6; a second reflecting layer 9 laminated on the outer surface of the first reflecting layer 8 to sandwich the controllable auto-heating type heat source 7 between the layers 8 and 9; and an adhesive double coated tape 10 fixedly adhering the first reflecting layer 8 to the low-pressure mercury lamp 6.

The low-pressure mercury lamp 6 is formed to be an approximately cylindrical shape of 2 mm to 6 mm in diameter, specifically, the low-pressure mercury lamp 6 is a cold cathode lamp or a hot cathode lamp.

FIG. 3 shows a specified structure of the controllable auto-heating type heat source 7.

In FIG. 3, the controllable auto-heating type heat source 7 is a long, slender board-shaped heating element having two metallic core wires 11 covered with a heating composition, which has length L approximately corresponding to the length of the low-pressure mercury lamp 6, more specifically, from 50 mm to 400 mm, thickness T ranging from 0.3 mm to 0.8 mm, and width W ranging from 1 mm to 3 mm. The width W is less than half diameter d of the low-pressure mercury lamp 6.

The two metallic core wires 11 works as an electrode couple which is placed along the longitudinal direction of the low-pressure mercury lamp 6, and each have diameter D ranging from 0.1 mm to 0.3 mm.

The metallic core wire 11 is made of a metallic wire or a metallic tape, and formed to be a sectional circular shape as shown in the drawing, but it may be formed to be a sectional oval shape or a sectional square shape.

The heating composition of the controllable auto-heating type heat source 7 consists of thermoplastic resin and conductive particles, and has the positive temperature coefficient characteristics (PTC characteristics) which shows resistance value increase with the rise in temperature.

In the fabrication of the controllable auto-heating type heat source 7, the heating composition, which is formed by kneading the thermoplastic resin and the conductive particles, is extruded together with the metallic core wires 11.

Concerning the thermoplastic resin used here, the crystalline thermoplastics is desirable, more specifically, polyolefin resin and copolymer resin thereof, a polyamide type resin, polyacetal resin, thermoplastic polyester resin, polyphenylene oxide, nonyl resin, polysulfone and so on can be listed.

Respecting polyolefin resin, for example, a polyethylene class such as a high-density polyethylene, a medium-density polyethylene, a low-density polyethylene, a linear low density polyethylene and so on; a polypropylene class such as isotactic polypropylene, syndiotactic polypropylene and so on; polybutene; 4-methylpentene-1 resin; and so on can be listed.

In the first embodiment, the following can be used: an ethylene acrylate type copolymer such as an ethylene propylene copolymer, an ethylene-vinyl acetate copolymer, an ethylene acrylic acid copolymer, an ethylene ethyl acrylate copolymer, an ethylene methyl acrylate copolymer and so on; a copolymer of olefin, such as an ethylene-vinyl chloride copolymer and so on, and a vinyl compound; a fluorine-containing ethylene type copolymer; and denatured substance of the aforementioned components.

In the above description, as to a vinyl acetate type resin, for example, a vinyl acetate resin, polyvinyl acetoacetal, polyvinyl butyral and so on can be listed.

Respecting polyamide resin, for example, nylon 6, nylon 8, nylon 11, nylon 66, nylon 610 and so on can be listed.

Polyacetal may either be a homopolymer or a copolymer.

Concerning thermoplastic polyester resin, for example, polyethylene terephthalate, polybutylene terephthalate and so on can be listed.

Concerning the crystalline thermoplastics, in addition to the above list, for example, diene type polymer and copolymer, such as trans-1,3-polyisoprene, syndiotactic-1, 2-polybutadiene, and so on can be listed.

Each of the above crystalline thermoplastics may be used alone or as a polymer blend of more than two components.

As the aforementioned components of the crystalline thermoplastics, an olefin type copolymer such as a high-density polyethylene, a low-density polyethylene, a linear polyethylene or an ethylene-vinyl acetate copolymer, an ethylene ethyl acrylate copolymer and so on, trans-1,4-polyisoprene and so on are desirable.

The aforementioned components of crystalline thermoplastics can be used as a composition with additives or another polymer as necessary.

Respecting the conductive particles described above, for example, the following can be listed: particulate matter such as carbon black particles, graphite particles or the like; powder matter such as metallic powder, oxidised metal powder or the like; and fibered matter of carbon fiber or the like. In the above list, particulate matter such as carbon black particles, graphite particles or the like is preferable, preferably, carbon black particles.

Each of the conductive particles listed above can be used alone or in a mixture of two or more.

A particle size of a conductive particle is not limited, but generally, the average particle size is, for example, 10 nm to 200 nm, preferably, 15 nm to 100 nm. Where the conductive particles are fiber, the aspect ratio is 1 to 1,000 generally, preferably, approximate 1 to 100.

The proportion of a mixture of the crystalline resin and the conductive particles is generally 10–80:90–20 by weight percentage, preferably, 55–75:45–25. When a proportion of conductive particles is below the above range, the resistance value of the controllable auto-heating type heat source 7 increases, so that the heat source 7 may not be sufficiently heated. But where a proportion of conductive particles exceeds the above range, the positive temperature coefficient characteristics do not sufficiently occur.

A specific resistance value of the heating composition of the controllable auto-heating type heat source 7 can be appropriately selected in response to requirement or purpose, but in normal times, it is preferable to select 10 Ω•cm to 50,000 Ω•cm, more preferably, 40 Ω•cm to 20,000 Ω•cm.

The cross-linking of the thermoplastic crystalline resin can be carried out by using a crosslinking agent and/or radiation. The crosslinking agent can be appropriately selected from organic peroxide, a sulfur compound, an oxime group, a nitroso compound, an amine compound, a polyamine compound and so on in response to a type of the thermoplastic crystalline resin.

For example, where the thermoplastic crystalline resin is a polyolefin type resin or the like, organic peroxide can be used as the suitable crosslinking agent. As organic peroxide, for example, the following is listed: benzoyl peroxide; lauroyl peroxide; dicumyl peroxide; tert-butyl peroxide; tert-butyl peroxy-benzoate; tert-butyl cumyl peroxide; 3-butyl hydro-peroxide; 2,5-dimethyl-2,5-di (tert-butyl peroxy) hexyne-3; 1,1-bis (tert-butyl peroxy isopropyl ) benzene; 1,1-bis (tert - butyl peroxy) - 3,3,5-trimethyl cyclohexane; n-butyl-4,4-bis (tert-butyl peroxy) valerate; 2,2-bis (tert-butyl peroxy) butane; tert-butyl peroxy benzene; and so on.

In the above list, 2,5-dimethyl-2,5-di (tert-butyl peroxy) hexyne-3 and so on are especially desirable. Incidentally, each of the above organic peroxide can be used alone, and can be used with addition of a crosslinking ancillary agent, such as triallyl cyanurate, di-vinyl-benzene, triallyl isocyanurate and so on, as necessary.

The proportions of the organic peroxide in the crystalline resin is generally 0.01% to 5% by weight, preferably 0.05% to 2% by weight, compared to the crystalline resin by weight of 100%. When the proportion decreases to less than 0.01% by weight easily result in insufficient crosslinking, thereby the positive temperature coefficient characteristics do not occur sufficiently, the resistance in a high-temperature area decreases, and so on. On the other hand, when the proportion increases to more than 5% by weight results in over-crosslinking, thereby leading to deterioration of moldability and the positive temperature coefficient characteristics.

Figure 4:
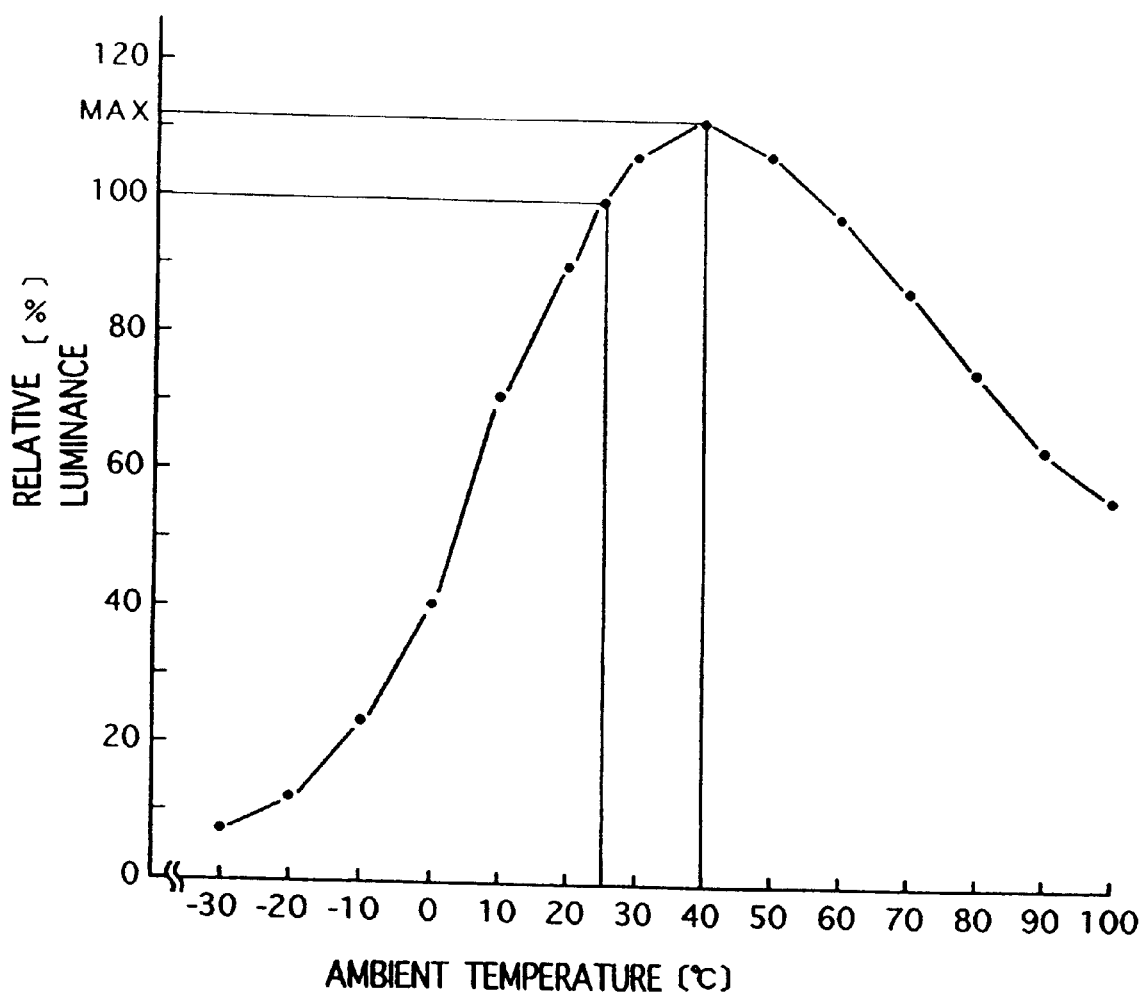
FIG. 4 is a graph showing the relationship between an ambient temperature and relative luminance of a low-pressure mercury lamp.

FIG. 4 is a graph showing the relationship between an ambient temperature and relative luminance of the low-pressure mercury lamp 6, of which luminance is 100% when the ambient temperature is 20° C. From the graph, it is understood that the luminous efficacy of the low-pressure mercury lamp 6 reaches the maximum value MAX when the ambient temperature is 40° C.

Figure 5:
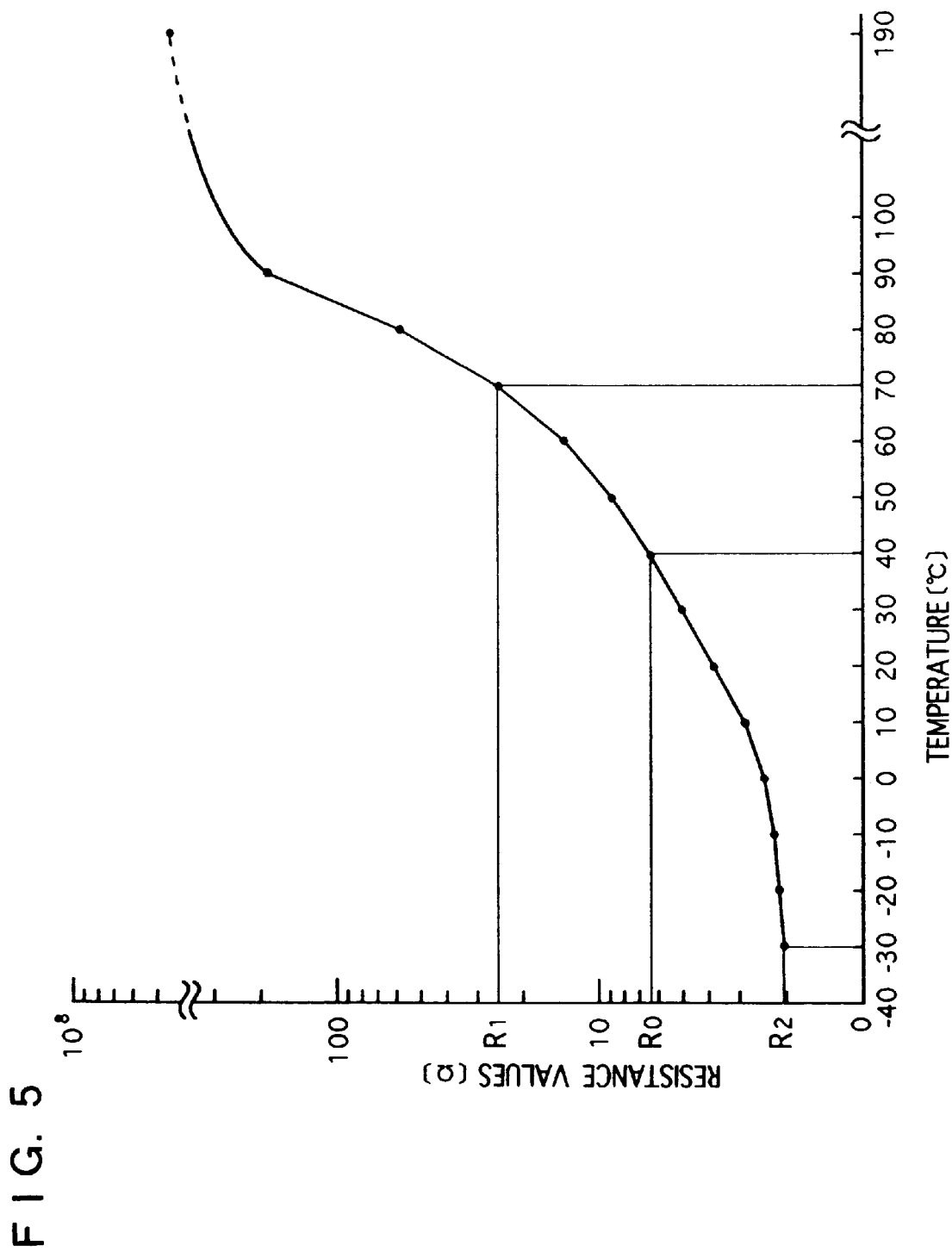
FIG. 5 is a graph showing the relationship between the resistance values and temperature of the controllable auto-heating type heat source.

FIG. 5 is a graph showing the relationship between the resistance values and the temperature of the controllable auto-heating type heat source 7. From the graph, it is understood that the controllable auto-heating type heat source 7 has the positive temperature coefficient characteristics which show that resistance value increases with the rise in the temperature.

Concerning resistance temperature property of the controllable auto-heating type heat source 7, a change in resistance values ($R_1/R_0$) is more than 1.2 times, preferably more than 4 times, more preferably more than 100 times. in the range between resistance value $R_0$, which is shown in the temperature (40° C.) at which the luminous efficacy of the low-pressure mercury lamp 6 reaches the maximum, and resistance value $R_1$, which is shown in the temperature (70° C.) which is 30° C. higher than that of the resistance value $R_0$. And further, a change in resistance values ($R_0/R_2$) is less than 10 times, preferably within twice, in the range from resistance value $R_2$ shown in the temperature −30° C. to the resistance value $R_0$ which is shown in the temperature at which the luminous efficacy of the low-pressure mercury lamp 6 reaches the maximum.

In the resistance temperature property of the controllable auto-heating type heat source 7, a change in resistance values does not show decrease within the range between the temperature (40° C.) at the maximum luminous efficacy of the low-pressure mercury lamp 6 and the temperature (190° C.) which is 150° C. higher than the above temperature (40° C.).

In FIG. 1 and FIG. 2, the first light reflecting layer 8 and the second light reflecting layer 9 are each composed of a reflective sheet which covers all of the back face of the light guiding plate 5, the peripheries of the two low-pressure mercury lamps 6, and a part of the front face of the light guiding plate 5. The light irradiated from the low-pressure mercury lamps 6 is irradiated onto the light guiding plate 5.

The reflective sheet composing of the first light reflecting layer 8 is made of white foaming PET (polyethylene terephthalate), which has the thickness ranging from 0.05 mm to 0.2 mm.

The reflective sheet composing of the second light reflecting layer 9 is made of white foaming PET (polyethylene terephthalate), which is thicker than the first light reflecting layer 8, more specifically, has the thickness ranging from 0.1 mm to 0.5 mm.

The controllable auto-heating type heat source 7 is placed between the light reflecting layers 8 and 9, so that the first light reflecting layer 8 is formed to be an approximately angular-shape of which the top is on the side of the low-pressure mercury lamp 6.

The light reflecting layers 8 and 9 may be mutually attached with an adhesive double coated tape. Alternatively, a laminated sheet can be formed by placing an EEA resin sheet or an LLDPE resin sheet as a thermal fusing layer onto the surface of the reflective sheet composing the first light reflecting layer 8, and then the light reflecting layers 8 and 9 can be mutually attached by thermally fusing the laminated sheet.

In the first embodiment, at least one of the light reflecting layers 8 and 9 can be composed of an aluminium sheet or a silver sheet; or the first light reflecting layer 8 faced to the low-pressure mercury lamp 6 may be made of a white coating compound or a white forming resin.

The adhesive double coated tape 10 is connected with the controllable auto-heating type heat source 7 and the low-pressure mercury lamp 6 to cause the heat source 7 and the lamp 6 to be thermally associated with each other through the first light reflecting layer 8. The tape 10 has width ranging from 0.5 mm to 2 mm and thickness ranging from 0.1 mm to 0.5 mm in order to decrease the area where it adheres to the low-pressure mercury lamp 6. As a result, the controllable auto-heating type heat source 7 is placed to have a distance from the low-pressure mercury lamp 6 for the thickness of the adhesive double coated tape 10.

The adhesive double coated tape 10 is made of a material which has the effective transparence and a greater thermal conductivity than that of air, such as acrylic resin, silicone resin and so on. In the embodiment, the adhesive double coated tape 10 works as a self-adhesive material and a translucent material. Instead of the tape 10, other adhesive materials of an acrylic type or a silicone type can be used as the self-adhesive material and the translucent material.

In the first embodiment described thus far, the light is irradiated from the low-pressure mercury lamp 6 by electrifying the lamp 6. The light irradiated from the low-pressure mercury lamp 6 is directly sent to the light guiding plate 5, or sent to the light guiding plate 5 after reflecting from the light reflecting layers 8 and 9, and then reaches the liquid crystal panel 3 through the light guiding plate 5.

When the display 1 is used under the low temperature condition, the metallic core wire 11 of the controllable auto-heating type heat source 7 is electrified so that the low-pressure mercury lamp 6 is heated by the controllable auto-heating type heat source 7. The resistance value of the controllable auto-heating type heat source 7 is controlled to be relatively low until the temperature reaches the temperature (40° C.) at which point the luminous efficacy of the low-pressure mercury lamp 6 reaches its maximum; so that the resistance value increases after the heat value increases and the temperature exceeds the temperature at the maximum luminous efficacy of the low-pressure mercury lamp 6, thereby controlling the heat value.

Therefore, the following effects are listed in the first embodiment.

1) In the luminaire 4 of the display 1 using the liquid crystal, since the controllable auto-heating type heat source 7 is placed on the periphery of the low-pressure mercury lamp 6, a temperature detecting means and a control circuit for controlling the heat source 7 are unnecessary in view of the heat source 7 as the controllable auto-heating type, thus avoiding the thermal runaway of the heat source 7.

2) The first and second light reflecting layers 8 and 9 are placed between the low-pressure mercury lamp 6 and the controllable auto-heating type heat source 7, so that the light reflecting layers 8 and 9 reflect the light irradiated from the low-pressure mercury lamp 6, and hence the amount of the beam of light shielded by the controllable auto-heating type heat source 7 decreases.

3) The adhesive double coated tape 10 as the translucent material having the higher thermal conductivity than air is placed between the low-pressure mercury lamp 6 and the light reflecting layers 8 and 9, so that the light reflecting layers 8 and 9 satisfactorily reflect the light irradiated from the low-pressure mercury lamp 6, thereby further decreasing the amount of the beam of light shielded by the controllable auto-heating type heat source 7.

4) The light source is the long-cylindrical shaped low-pressure mercury lamp 6, and also the controllable auto-heating type heat source 7 has the electrode couple 11 located along the longitudinal direction of the low-pressure mercury lamp 6. Therefore, local heating does not occur along the longitudinal direction of the controllable auto-heating type heat source 7 by reason that the electrode couple 11 is placed along the longitudinal direction of the low-pressure mercury lamp 6, with the result that the low-pressure mercury lamp 6 is uniformly heated.

5) The controllable auto-heating type heat source 7 has the heat element which has the thermoplastic resin and the conductive particles including carbon black, and shows the positive temperature coefficient characteristics, so that the resistance value is not decreased in the high-temperature area by reason that the heating element itself has the positive temperature coefficient characteristics, thus effectively preventing the heat source 7 from overheating.

6) The resistance temperature property of the controllable auto-heating type heat source 7 is set as; resistance value at temperature (40° C.) at which the luminous efficacy of the low-pressure mercury lamp 6 reaches its maximum, is more than 1.2 times larger than resistance value at temperature (70° C.) which is 30° C. higher than the above temperature (40° C.); therefore resistance value increases when a temperature exceeds a temperature at which the luminous efficacy of the low-pressure mercury lamp 6 reaches its maximum; and thereby overheating of the heat source 7 just after the luminous efficacy of the low-pressure mercury lamp 6 has reached its maximum, can be prevented.

7) The resistance temperature property of the controllable auto-heating type heat source 7 is such that the change in resistance value is less than 10 times in the range from −30° C. to the temperature at the maximum luminous efficacy of the low-pressure mercury lamp 6, so that the resistance value of the heat source 7 is small up to the temperature at the maximum luminous efficacy of the low-pressure mercury lamp 6. As a result, a great amount of current flows into the heat source 7 until the luminous efficacy of the low-pressure mercury lamp 6 reaches the maximum, so that the heat value of the heat source 7 is allowed to be increased. Thereby rapidly starting the luminance of the liquid crystal panel 3.

8) The resistance temperature property of the controllable auto-heating type heat source 7 is such that the change in resistance value does not show decrease in the range between the temperature at the maximum luminous efficacy of the low-pressure mercury lamp 6 and the temperature which is 150° C. higher than the above temperature. Thereby avoiding the overheating of the heat source 7 even when the luminaire 4 is used under unusually high-temperatures.

9) The controllable auto-heating type heat source 7 is abutted to the low-pressure mercury lamp 6 to be thermally associated, so that heat generated in the heat source 7 is directly transferred into the low-pressure mercury lamp 6, thus enhancing the heating efficiency for the low-pressure mercury lamp 6.

10) The controllable auto-heating type heat source 7 is placed apart from the low-pressure mercury lamp 6 on the side opposite to the side which is irradiated by the low-pressure mercury lamp 6, so that the light reflective efficiency can be controlled to decrease by less than 10% although the heat source 7 is positioned around the low-pressure mercury lamp 6, therefore the amount of the beam of light which is shielded by the heat source 7 is surely decreased.

11) Width W of the controllable auto-heating type heat source 7 is defined as less than half of the diameter d of the low-pressure mercury lamp 6.

Therefore, although the beam of light generated by the low-pressure mercury lamp 6 is shielded by the heat source 7, the amount of the shielded light is decreased.

12) The adhesive double coated tape 10 functions as the self-adhesive material adheres the low-pressure mercury lamp 6 to the controllable auto-heating type heat source 7, so that the thermal association between the low-pressure mercury lamp 6 and the controllable auto-heating type heat source 7 is achieved by simple means.

13) The adhesive double coated tape 10 is provided between the low-pressure mercury lamp 6 and the light reflecting layers 8 and 9 as the translucent material having the thermal conductivity greater than air, so that the light reflecting layers 8 and 9 unquestionably reflect the light irradiated from the low-pressure mercury lamp 6. Thus further decreasing the amount of the light shielded by the controllable auto-heating type heat source 7.

The second embodiment according to the present invention will be described below with reference to FIG. 6.

In the second embodiment, what is differ from the first embodiment is that the low-pressure mercury lamp 6 is placed to have a predetermined distance from the first light reflecting layer 8 without the adhesive double coated tape, but the other structures of this embodiment is the same as that of the first embodiment.

Figure 6:
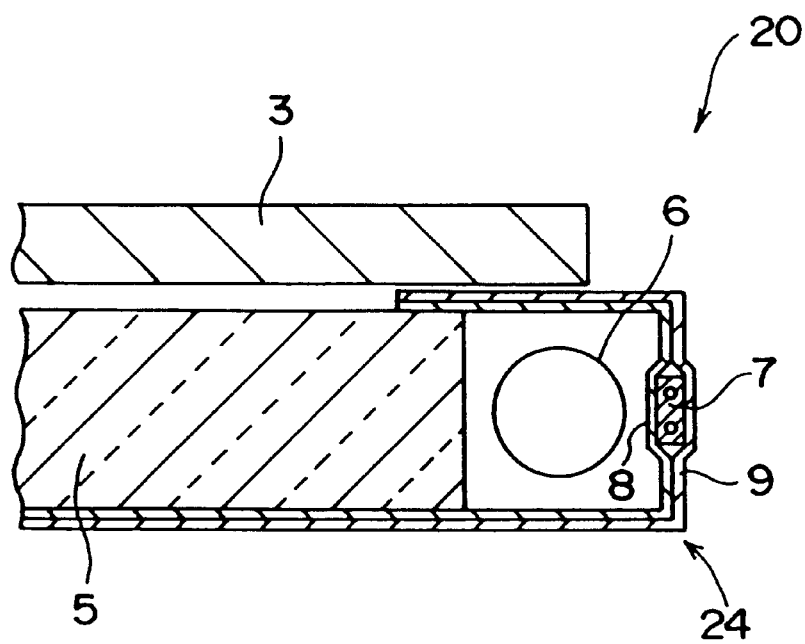
FIG. 6 is a fragmentary sectional view of the display according to the second embodiment of the present invention.

In FIG. 6 showing the fragmentary portion of the second embodiment, a display 20 according to the second embodiment is an edge-light type vehicle navigation system which is composed of the casing 2 (see FIG. 1), the liquid crystal panel 3, a luminaire 24 lighting the liquid crystal panel 3, and the light guiding plate 5. The luminaire 24 is composed of the low-pressure mercury lamp 6, the controllable auto-heating type heat source 7 and the first and second light reflecting layers 8 and 9, in which a space is formed between the low-pressure mercury lamp 6 and the first light reflecting layer 8.

Therefore, the effects similar to the Effects 1 to 11 listed in the first embodiment are also listed in the second embodiment.

The third embodiment of the present invention will be described below with reference to FIG. 7.

In this embodiment, the low-pressure mercury lamp 6 is placed at a different position on the light reflecting layers 8 and 9 from that in the first embodiment. But, the other structures of this embodiment are the same as that of the first embodiment.

Figure 7:
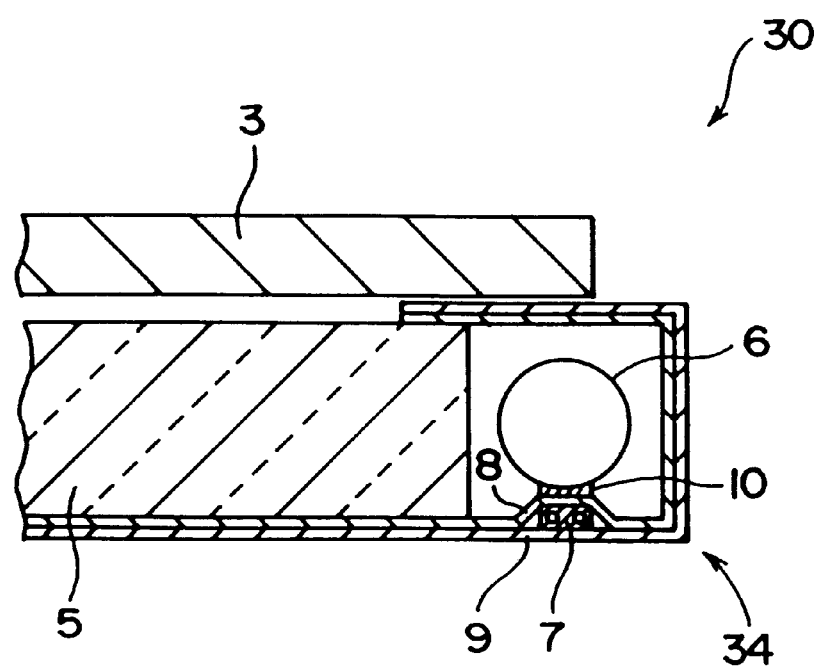
FIG. 7 is a fragmentary sectional view of the display according to the third embodiment of the present invention.

In FIG. 7 showing the fragmentary portion of the third embodiment, a display 30 according to this embodiment is an edge-light type vehicle navigation system which is composed of the casing 2 (see FIG. 1), the liquid crystal panel 3, a luminaire 34 lighting the liquid crystal panel 3, and light guiding plate 5.

Similar to the luminaire 4 of the first embodiment, the luminaire 34 is composed of the low-pressure mercury lamp 6, the controllable auto-heating type heat source 7, the first and second light reflecting layers 8 and 9, and the adhesive double coated tape 10. The controllable auto-heating type heat source 7 is fixedly adhered to the low-pressure mercury lamp 6 with the adhesive double coated tape 10 on a side in a direction excepting the two directions toward the side of the light guiding plate and the side opposite to the light guiding plate, namely, on a side in a direction perpendicular to the above two directions.

Therefore, the effects similar to the Effects 1 to 13 mentioned in the first embodiment are also listed in the third embodiment.

The fourth embodiment according to this invention will be explained below with reference to FIG. 8.

In the fourth embodiment, the configurations of low-pressure mercury lamp, controllable auto-heating type heat source and light reflecting layers are different from that in the first embodiment. But the other structures of this embodiment are the same as that of the first embodiment.

Figure 8:
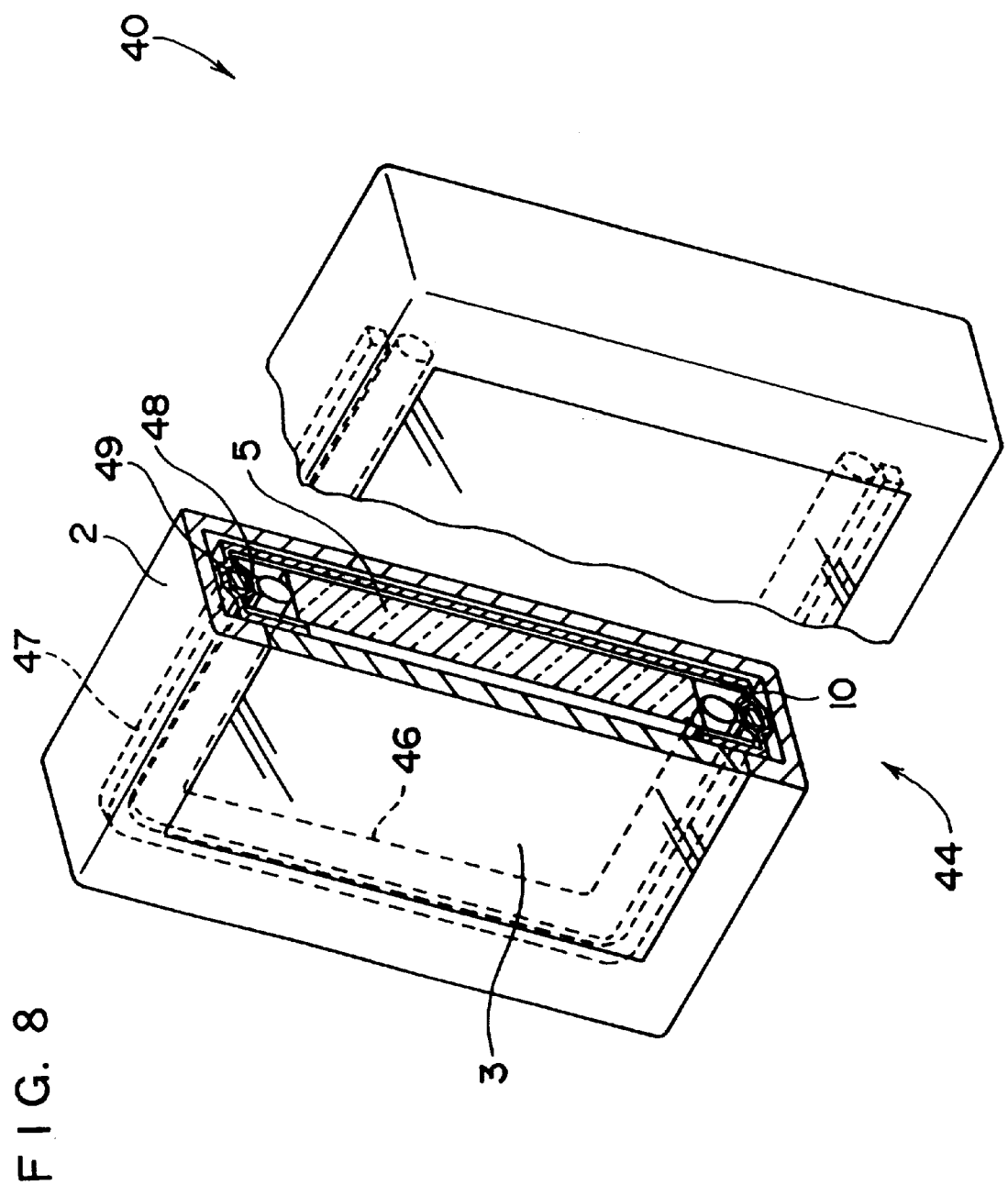
FIG. 8 is a perspectively cutaway view of the display according to the fourth embodiment of the present invention

In FIG. 8 showing whole structure of the fourth embodiment, a display 40 of this embodiment is an edge-light type vehicle navigation system which is composed of the casing 2 (see FIG. 1), the liquid crystal panel 3, a luminaire 44 for lighting the liquid crystal panel 3, and the light guiding plate 5.

The luminaire 44 is, in turn, composed of a low-pressure mercury lamp 46 bent in a C-shape; a controllable auto-heating type heat source 47 placed along the low-pressure mercury lamp 46; a first light reflecting layer 48 partially placed between the low-pressure mercury lamp 46 and the controllable auto-heating type heat source 47 and confronting the low-pressure mercury lamp 46; a second light reflecting layer 49 laminated on the outer surface of the first light reflecting layer 48, with the controllable auto-heating type heat source 47 being located between the light reflecting layers 48 and 49; and the adhesive double coated tape 10 fixedly adhering the first reflecting layer 48 to the low-pressure mercury lamp 46.

The controllable auto-heating type heat source 47 has the same structure as the controllable auto-heating type heat source 7, but has pliability to be able to be placed along the low-pressure mercury lamp 46. Naturally, the electrode couple of the controllable auto-heating type heat source 47 is placed along the longitudinal direction of the low-pressure mercury lamp 46.

The light reflecting layers 48 and 49 have the same structure as the light reflecting layers 8 and 9 but are placed along the C-shaped low-pressure mercury lamp 46.

Therefore, the effects similar to the Effects 1 to 13 listed in the first embodiment are also listed in the fourth embodiment.

Next, Experiments will be explained below in order to confirm the effects of the first to the third embodiments.

Experiment 1

60 wt % of an ethylene ethyl acrylate copolymer (EEA) and 40 wt % of carbon black are kneaded in a biaxial kneader to obtain pellet-shaped mixtures. 0.3 wt % relative to resin of Perhexyne25B is added as a crosslinking agent into the obtained pellet-shaped mixtures.

The above pellet-shaped mixtures and two copper wires (metallic core wires) of 0.26 mm in diameter are co-extruded together by using the kneader to obtain a sectional rectangular shaped forming having the thickness T of 0.72 mm and the width W of 1 mm. The controllable auto-heating type heat source 7 is obtained by cutting the above forming in the length L of 15 cm.

The first and second light reflecting layers 8 and 9 are each made of a sheet of white foaming PET and are mutually adhered with the adhesive double coated tape. Incidentally, it is possible that a laminated sheet is formed by placing an EEA resin sheet or an LLDPE resin sheet as a thermally fusing layer onto the face of the reflecting sheet composing the first light reflecting layer 8, and then the light reflecting layers 8 and 9 are attached by thermally fusing the laminated sheets.

The structures of the low-pressure mercury lamp 6, the heat source 7 and the light reflecting layers 8 and 9 in Experiment 1 correspond to these in the second embodiment.

13

In Experiment 1 described thus far, the luminance of the low-pressure mercury lamp 6 is measured in the stable state in which the ambient temperature is 25° C. And, during the state in which the low-pressure mercury lamp 6 is lighted and the controllable auto-heating type heat source 7 is electrified in the ambient temperature is −30° C., the temperature of a tube-wall of the low-pressure mercury lamp 6 is measured after 60 seconds had elapsed since the lamp was lighted.

The results are shown in Table 1.

Experiment 2

Experiment 2 corresponds to the first embodiment, in which the specific structures of the controllable auto-heating type heat source 7 and the first and second light reflecting layers 8 and 9 are the same as that of Experiment 1.

In Experiment 2, the same measurement as that in Experiment 1. The results are shown in Table 1.

Comparison 2

What differs in Comparison 2 from the first embodiment is that the first light reflecting layer 8 is omitted and the controllable auto-heating type heat source 7 is directly connected to the low-pressure mercury lamp 6. In Comparison 2, the same measurement as that in Experiment 1. The results are shown in Table 1.

Comparison 3

What differs in Comparison 3 from the first embodiment is that the first light reflecting layer 8 is omitted, in which there is nothing between the controllable auto-heating type heat source 7 and the low-pressure mercury lamp 6. In Comparison 3, the same measurement as that in Experiment 1 is conducted. The results are shown in Table 1.

TABLE 1

|  | Stable state of ambient temperature 25° C. | | Ambient temperature −30° C. | | |
| --- | --- | --- | --- | --- | --- |
|  | Luminance (cd/m²) | Comparison of luminance: A | Temperature of tube-wall | Luminance after 60 sec.: B (estimate) | Total A × B |
| Ex. 1 | 3405 | 89.9% | 16.9° C. | 77% | 69% |
| Ex. 2 | 3415 | 90.2% | 21.3° C. | 83% | 75% |
| Ex. 3 | 3123 | 82.4% | 21.3° C. | 83% | 68% |
| Ex. 4 | 3586 | 94.7% | 19.8° C. | 81% | 77% |
| Com. 1 | 3788 | 100% | −10.0° C. | 21% | 21% |
| Com. 2 | 2570 | 67.8% | 52.3° C. | 93% | 63% |
| Com. 3 | 2417 | 65.2% | 13.5° C. | 73% | 48% |

*The luminance after 60 seconds: B is a relative value of the luminance after 60 seconds in −30° C. when the luminance in the stable state of room temperature (25° C.) is defined as 100% in each structure.
*Ex. is Experiment.
*Com. is Comparison.

Experiment 3

Experiment 3 corresponds to the third embodiment, in which the specific structures of the controllable auto-heating type heat source 7 and the first and second light reflecting layers 8 and 9 are the same as that of Experiment 1. But, the thickness of the adhesive double coating tape 10 adhering the first light reflecting layer 8 to the low-pressure mercury lamp 6 is defined to be 0.06 mm.

In Experiment 3, the same measurement as that in Experiment 1 is conducted. The results are shown in Table 1.

Experiment 4

Experiment 4 corresponds to the third embodiment, in which the specific structures of the controllable auto-heating type heat source 7 and the first and second light reflecting layers 8 and 9 are the same as that of Experiment 1. But, the thickness of the adhesive double coating tape 10 adhering the first light reflecting layer 8 to the low-pressure mercury lamp 6 is defined to be 0.4 mm.

In Experiment 4, the same measurement as that in Experiment 1 is conducted. The results are shown in Table 1.

Comparison 1

A different point of Comparison 1 from the first embodiment is that the controllable auto-heating type heat source 7 or the other heaters are omitted. In Comparison 1, the same measurement as that in Experiment 1. The results are shown in Table 1.

As is clear from Table 1, the luminance in Comparison 1 is the highest in the stable state of the ambient temperature 25° C. This reason is that, in the ambient temperature 25° C., the low-pressure mercury lamp 6 is not affected in the low-temperature and most of the light irradiated from the low-pressure mercury lamp 6 is transferred to the light guiding plate 5 without being shielded. Therefore, concerning the comparison of luminance shown in Table 1, the value of Comparison 1 is defined as 100%.

In Comparisons 2 and 3, the light irradiated from the low-pressure mercury lamp 6 is shielded much by the controllable auto-heating type heat source 7, thereby decreasing the luminance.

In each Experiment, however, the luminance is not decreased greatly as compared with that in Comparison 1.

The highest luminance estimate B when the ambient temperature is minus 30° C. is that of Comparison 2 in which the controllable auto-heating type heat source 7 is directly connected to the low-pressure mercury lamp 6. But, the values in Experiments 1 to 4 are not decreased greatly as compared with Comparison 2.

Therefore, as the total evaluation, the total luminance (A×B) after 60 seconds elapsed in the ambient temperature −30° C. is more than 69% in each of Experiments 1 to 4. But, 63% of Comparison 2 is the highest value in Comparisons, and Comparisons 1 and 3 do not amount to Experiments.

It is to be understood that the present invention is not intended to be limited to the above-described embodiments, and include modifications insofar as the objects of the present invention are attained.

For example, the light reflecting layers 8, 9, 48 and 49 are formed to be two layers in the embodiments, but in this invention it is sufficient that at least one light reflecting layer may be formed to attain the object of this invention. In this case, the aforementioned white coating compound or the like may be coated on a film made of a material non-reflecting light, such as dark-colored plastic, or the white foaming PET sheet may be laminated on the film. In other words, in this invention, the requirement of the material of the layer is to reflect the light irradiated from the low-pressure mercury lamps 6 and 46.

In the embodiments, each of the controllable auto-heating type heat sources 7 and 47 includes two metallic core wires, but it can include more than three metallic core wires in this invention.

And, in the present invention, a ceramic type PTC heater may be used as the controllable auto-heating type heat source.

The display is defined as the edge-light type vehicle navigation system in the embodiments, but it may be a direct-type back light type vehicle navigation system, and may include any displays using liquid crystal, such as a vehicle meter, office automation products (e.g., a word processor, a personal computer or the like) and so on.

And further, the light source is not limited to the low-pressure mercury lamps 6 and 46.

According to the present invention, the controllable auto-heating type heat source is placed on the periphery of the light source and the light reflecting layer is placed between the light source and the controllable auto-heating type heat source, so that a temperature detecting means and a control circuit in order to control the heat source are not needed. Therefore, the heat source does not cause thermal runaway, and moreover, the light reflecting layer reflects the light irradiated from the light source, thereby allowing the amount of the beam of light shielded by the controllable auto-heating type heat source to be decreased.

As described thus far, the present invention is convenient to be used for a display using liquid crystals, such as a vehicle meter, navigation system and so on.

What is claimed is:

1. A luminaire in which a controllable auto-heating type heat source is located at a periphery of a light source so that heat generated thereby is transferred to said light source, comprising a light reflecting layer provided at least between said light source and said controllable auto-heating type heat source, wherein said controllable auto-heating type heat source includes a heating element which has thermoplastic resin and conductive particles consisting of carbon black, and shows positive temperature coefficient characteristics.

2. A luminaire in which a controllable auto-heating type heat source is located adjacent a periphery of a light source, comprising a light reflecting layer provided at least between said light source and said controllable auto-heating type heat source, said luminaire further comprising a translucent material provided between said light source and said light reflecting layer, the translucent material having a greater thermal conductivity than that of air.

3. The luminaire according to claim 1:
wherein said light source is formed having an elongated shape; and
wherein said controllable auto-heating type heat source includes an electrode couple extending along a longitudinal direction of said light source.

4. The luminaire according to claim 1, wherein a resistance temperature property of said controllable auto-heating type heat source has a change in resistance values of more than 1.2 times in a range between a temperature at a maximum luminous efficacy of said light source and a second temperature 30° C. higher than the temperature at the maximum luminous efficacy of said light source.

5. The luminaire according to claim 1, wherein a resistance temperature property of said controllable auto-heating type heat source is defined so that a resistance value at a temperature where the luminous efficacy of said light source reaches its maximum is less than ten times larger than a second resistance value at a temperature of minus 30° C.

6. The luminaire according to claim 1, wherein a resistance temperature property of said controllable auto-heating type heat source shows no decrease in resistance value at temperatures ranging from a temperature at which the luminous efficacy of said light source reaches its maximum to a second temperature which is 150° C. higher than the temperature at which the luminous efficacy of said light source reaches its maximum.

7. The luminaire according to claim 1, wherein said controllable auto-heating type heat source abuts said light source to be thermally associated.

8. The luminaire according to claim 1, wherein said controllable auto-heating type heat source is located on a side of said light source opposite to the side from which said light source irradiates light.

9. The luminaire according to claim 1, wherein said light source is an approximately cylindrical shaped low-pressure mercury lamp; and
wherein the width of said controllable auto-heating type heat source is less than half of the diameter of said low-pressure mercury lamp.

10. The luminaire according to claim 1, wherein said light source and said controllable auto-heating type heat source are thermally associated through a self-adhesive material.

11. A luminaire in which a controllable auto heating type heat source is located at a periphery of a bent low-pressure mercury lamp so that heat generated thereby is transferred to said low-pressure mercury lamp, comprising a light reflecting layer provided at least between said low-pressure mercury lamp and said controllable auto-heating type heat source, and
wherein said controllable auto-heating type heat source is pliable and positioned along said low-pressure mercury lamp.

12. A display comprising:
said luminaire according to claim 1; and
a translucent type display panel illuminated by the luminaire.

13. The luminaire according to claim 12, wherein said translucent type display panel comprises a liquid crystal panel.

14. The display according to claim 13, further comprising a light guiding plate for guiding light from said luminaire wherein said controllable auto-heating type heat source is located at the opposite side of said light source from said light guiding plate.

15. The display according to claim 13, further comprising a light guiding plate for guiding light from said luminaire, wherein said controllable auto-heating type heat source is adhered to said light source by a self-adhesive material being translucent in any one of two directions except for the other two directions of the side of said light guiding plate and the opposite side of said light source from said light guiding plate.

16. The display according to claim 14, wherein said light guiding plate is a transparent acrylic plate.

17. The display according to claim 14, wherein said light reflecting layer is composed of a reflective sheet covering a back face of said light guiding plate and the periphery of said light source.

18. The display according to claim 17, wherein said reflective sheet is made of white foaming polyethylene terephthalate.

19. The luminaire according to claim 1, wherein luminance of said light source is dependent on temperature.

20. The luminaire according to claim 1, wherein said controllable auto-heating type heat source is thermally conductive with said light source.

21. The luminaire according to claim 1, wherein luminance of said light source is dependent on temperature and said light source is thermally conductive with said auto-heating type heat source.

22. The luminaire according to claim 1, wherein said light reflecting layer does not block heat conduction between said light source and said controllable auto-heating type heat source.

23. The luminaire according to claim 1, wherein said light reflecting layer reflects light irradiated from said light source toward said controllable auto-heating type heat source.

24. The luminaire according to claim 1, wherein said light reflecting layer does not block heat conduction between said light source and said controllable auto-heating type heat source and reflects light irradiated from said light source toward said controllable auto-heating type heat source.

* * * * *